(12) United States Patent
Tinnin et al.

(10) Patent No.: US 7,306,259 B2
(45) Date of Patent: Dec. 11, 2007

(54) LOCK FOR TILTING AND TELESCOPING STEERING COLUMN

(75) Inventors: Melvin Lee Tinnin, Clio, MI (US); Xiaoyu Li, Saginaw, MI (US); Richard K. Riefe, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 380 days.

(21) Appl. No.: 10/965,539

(22) Filed: Oct. 14, 2004

(65) Prior Publication Data

US 2006/0082119 A1    Apr. 20, 2006

(51) Int. Cl.
*B62D 1/18* (2006.01)

(52) U.S. Cl. .................. 280/775; 280/777; 74/493
(58) Field of Classification Search ............... 280/775, 280/777, 779; 74/493, 492
See application file for complete search history.

(56) References Cited

U.S. PATENT DOCUMENTS

| 4,793,204 | A | * | 12/1988 | Kubasiak | 74/493 |
|---|---|---|---|---|---|
| 5,222,410 | A | * | 6/1993 | Kinoshita | 74/493 |
| 5,259,818 | A | * | 11/1993 | Kachi et al. | 464/89 |
| 5,524,927 | A | * | 6/1996 | Toussaint | 280/777 |
| 5,673,937 | A | * | 10/1997 | Fevre et al. | 280/777 |
| 5,678,454 | A | * | 10/1997 | Cartwright et al. | 74/493 |
| 5,743,150 | A | * | 4/1998 | Fevre et al. | 74/493 |
| 5,961,146 | A | * | 10/1999 | Matsumoto et al. | 280/777 |
| 6,036,228 | A | * | 3/2000 | Olgren et al. | 280/775 |
| 6,131,481 | A | | 10/2000 | Wilson et al. | |
| 6,183,012 | B1 | * | 2/2001 | Dufour et al. | 280/777 |
| 6,189,405 | B1 | * | 2/2001 | Yazane | 74/493 |
| 6,224,104 | B1 | * | 5/2001 | Hibino | 280/777 |
| 6,729,648 | B2 | * | 5/2004 | Ulintz | 280/777 |
| 7,150,204 | B2 | * | 12/2006 | Uphaus et al. | 74/493 |
| 2002/0089161 | A1 | * | 7/2002 | Yamamura et al. | 280/777 |
| 2002/0140219 | A1 | * | 10/2002 | Tsunoda et al. | 280/779 |
| 2005/0183534 | A1 | * | 8/2005 | Maida et al. | 74/492 |
| 2005/0199087 | A1 | * | 9/2005 | Li et al. | 74/493 |
| 2005/0204852 | A1 | * | 9/2005 | Li et al. | 74/492 |

* cited by examiner

*Primary Examiner*—Paul N. Dickson
*Assistant Examiner*—Joseph Rocca
(74) *Attorney, Agent, or Firm*—Michael D. Smith (57) ABSTRACT

The invention provides an apparatus including first and second steering column members engaged for pivotal movement relative to one another. The apparatus also includes a third steering column member supporting the first steering column member for sliding movement along an axis. The apparatus also includes a positive lock engaged with the first and second steering column members. The positive lock can operate in a locked configuration to prevent the pivotal movement. The positive lock can also operate in an unlocked configuration to allow the pivotal movement. The apparatus also includes a friction lock engaged with said first and third steering column members. The friction lock can operate in a locked configuration to prevent the sliding movement. The friction lock can also operate in an unlocked configuration to allow the sliding movement.

39 Claims, 5 Drawing Sheets

FIG. 5

LOCK FOR TILTING AND TELESCOPING STEERING COLUMN

FIELD OF THE INVENTION

The invention relates to a lock for a steering column.

BACKGROUND OF THE INVENTION

Vehicles can be equipped with steering columns that adjust the position of the steering wheel to enhance the comfort and safety of the driver. For example, the steering column can telescope to move closer to and away from the driver. Also, the position of the steering wheel can be tilted relative to the driver. These features together enable the driver to adjust the steering wheel to a desired, convenient position for operating the vehicle, and for enabling the wheel to be moved out of the way to provide greater access to getting into and out of the driver's seat of the vehicle.

SUMMARY OF THE INVENTION AND ADVANTAGES

The invention provides an apparatus including first and second steering column members engaged for pivotal movement relative to one another. The apparatus also includes a third steering column member supporting the first steering column member for sliding movement along an axis. The apparatus also includes a positive lock engaged with the first and second steering column members. The positive lock can operate in a locked configuration to prevent the pivotal movement. The positive lock can also operate in an unlocked configuration to allow the pivotal movement. The apparatus also includes a friction lock engaged with said first and third steering column members. The friction lock can operate in a locked configuration to prevent the sliding movement. The friction lock can also operate in an unlocked configuration to allow the sliding movement.

The invention substantially reduces the likelihood that the second steering column member will pivot during collapse of the steering column in response to a vehicle crash. The invention also substantially reduces the likelihood of skipping during collapse of the steering column in response to a vehicle crash.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring now to FIGS. 1-6, an apparatus 10 includes first and second steering column members 12, 14 engaged for pivotal movement relative to one another. A third steering column member 16 supports the first steering column member 12 for sliding movement along an axis 18. The exemplary embodiment of the invention includes three steering column members, however, alternative embodiments of the invention could include two steering column members. For example, steering columns that include upper and lower telescoping jackets, and not a tilt housing, pivot about a lower end of the lower jacket. The invention can be practiced with such a steering column.

The apparatus 10 also includes a positive lock 20 engaged with the first and second steering column members 12, 14. The positive lock 20 is operable in a locked configuration to prevent the pivotal movement of the second steering column member 14 relative to the first steering column member 12. The positive lock 20 is also operable in an unlocked configuration to allow the pivotal movement. The exemplary embodiment of the invention includes a positive lock having teeth (described in greater detail below), however, alternative embodiments of the invention could include different locking structures such a combination of a pin and aperture, or detents, or any combination of teeth and apertures and detents.

The apparatus 10 also includes a friction lock 22 engaged with the first and third steering column members 12, 16. The friction lock 22 is operable in a locked configuration to prevent the sliding movement between the first steering column member 12 and the third steering column member 16. The friction lock 22 is also operable in an unlocked configuration to allow the sliding movement. The friction lock 22 will be described in greater detail below.

In the exemplary embodiment of the invention, the positive lock 20 and the friction lock 22 share at least one common member 24. The common member 24 is a shaft 24 moveable in first and second directions 26, 28. Both the positive lock 20 and the friction lock 22 change configuration to the respective locked configurations in response to movement of the common member 24 in the first direction 26. Also, the positive lock 20 and the friction lock 22 change configuration to the respective unlocked configurations in response to movement of the common member 24 in the second direction 28. The first and second directions 26, 28 are angular directions in the exemplary embodiment of the invention. However, in alternative embodiments of the invention, movement of the common member could be translational or be a combination of rotation and translation.

Figure 1:
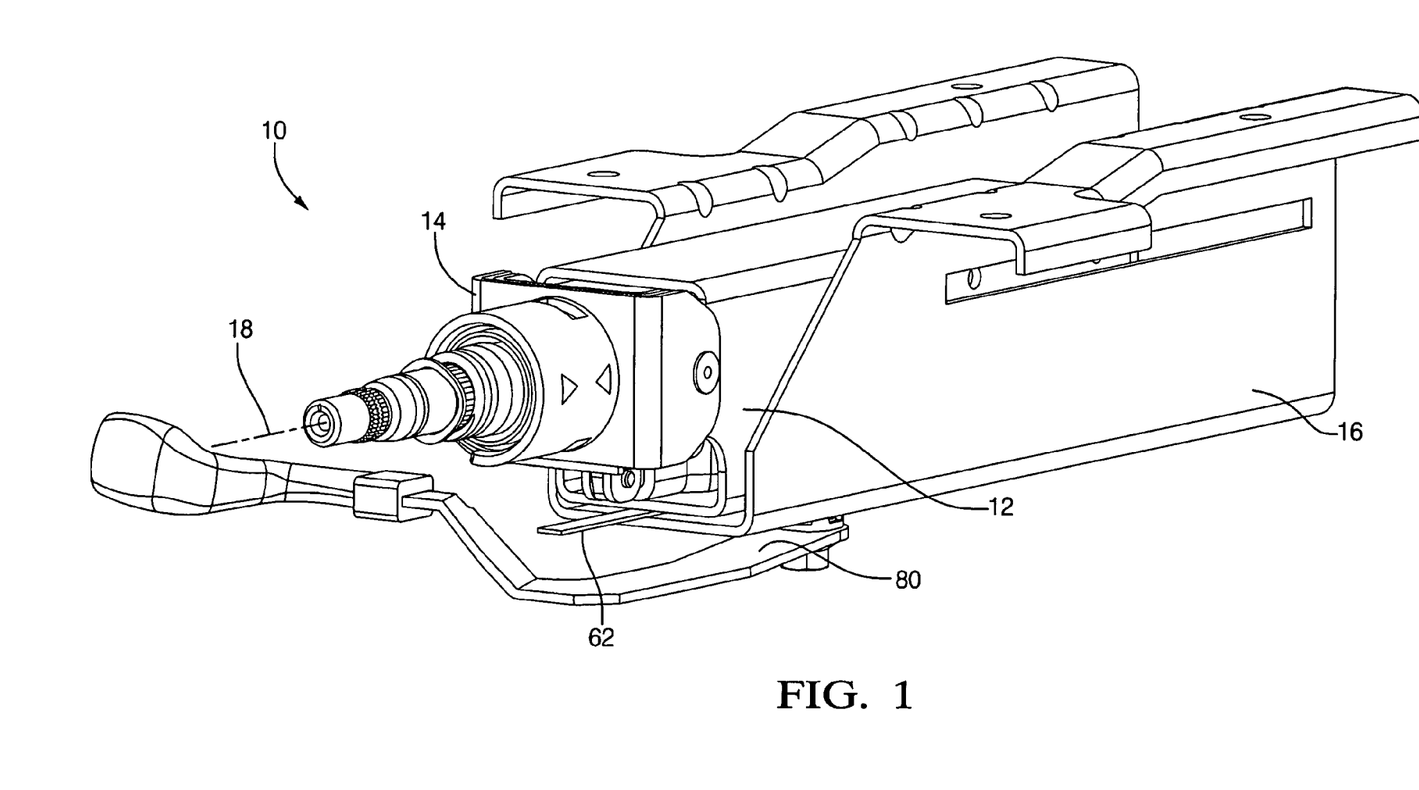
FIG. 1 is a first perspective view of an exemplary embodiment of the invention.
Figure 2:
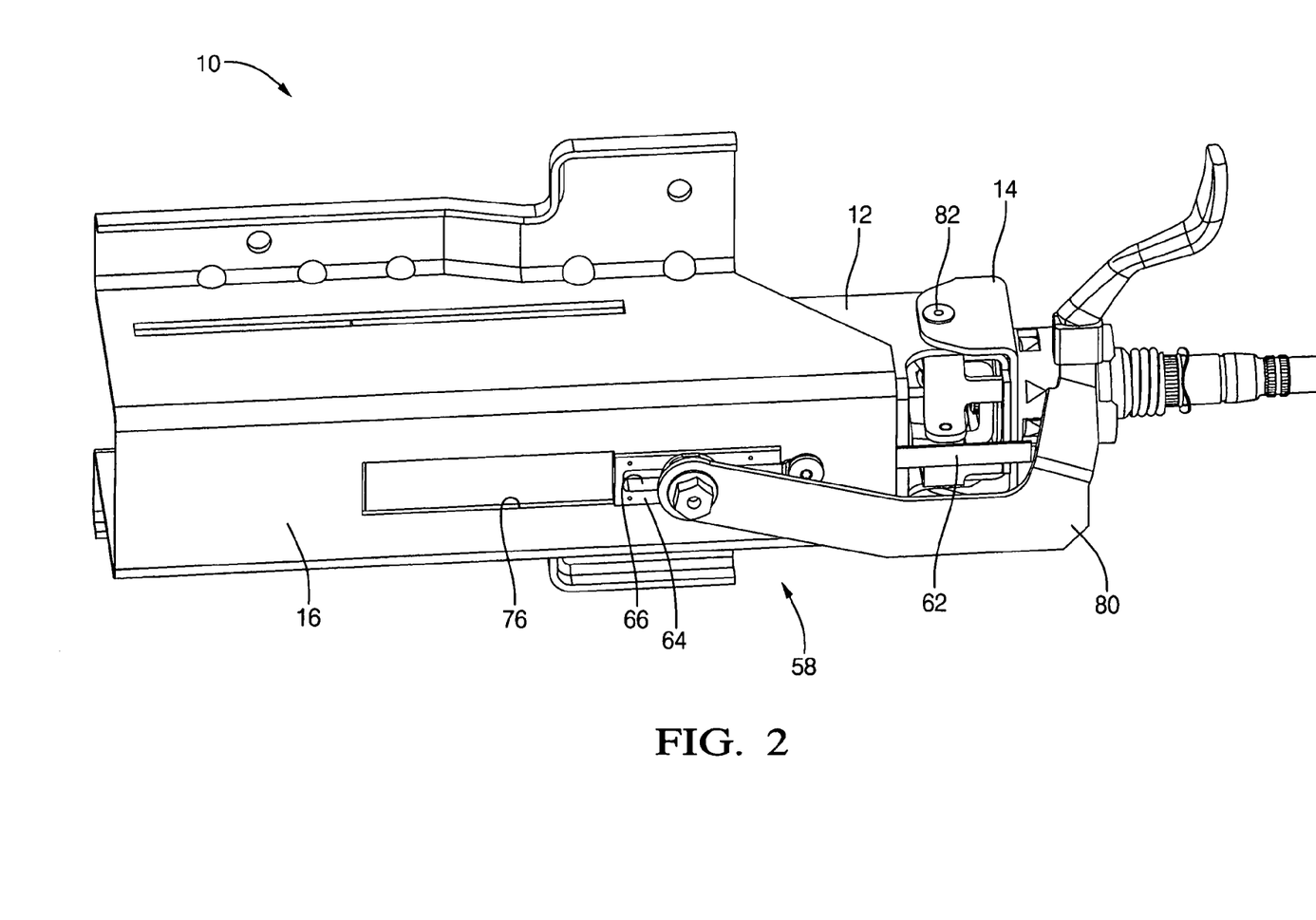
FIG. 2 is a second perspective view of the exemplary embodiment of the invention.
Figure 3:
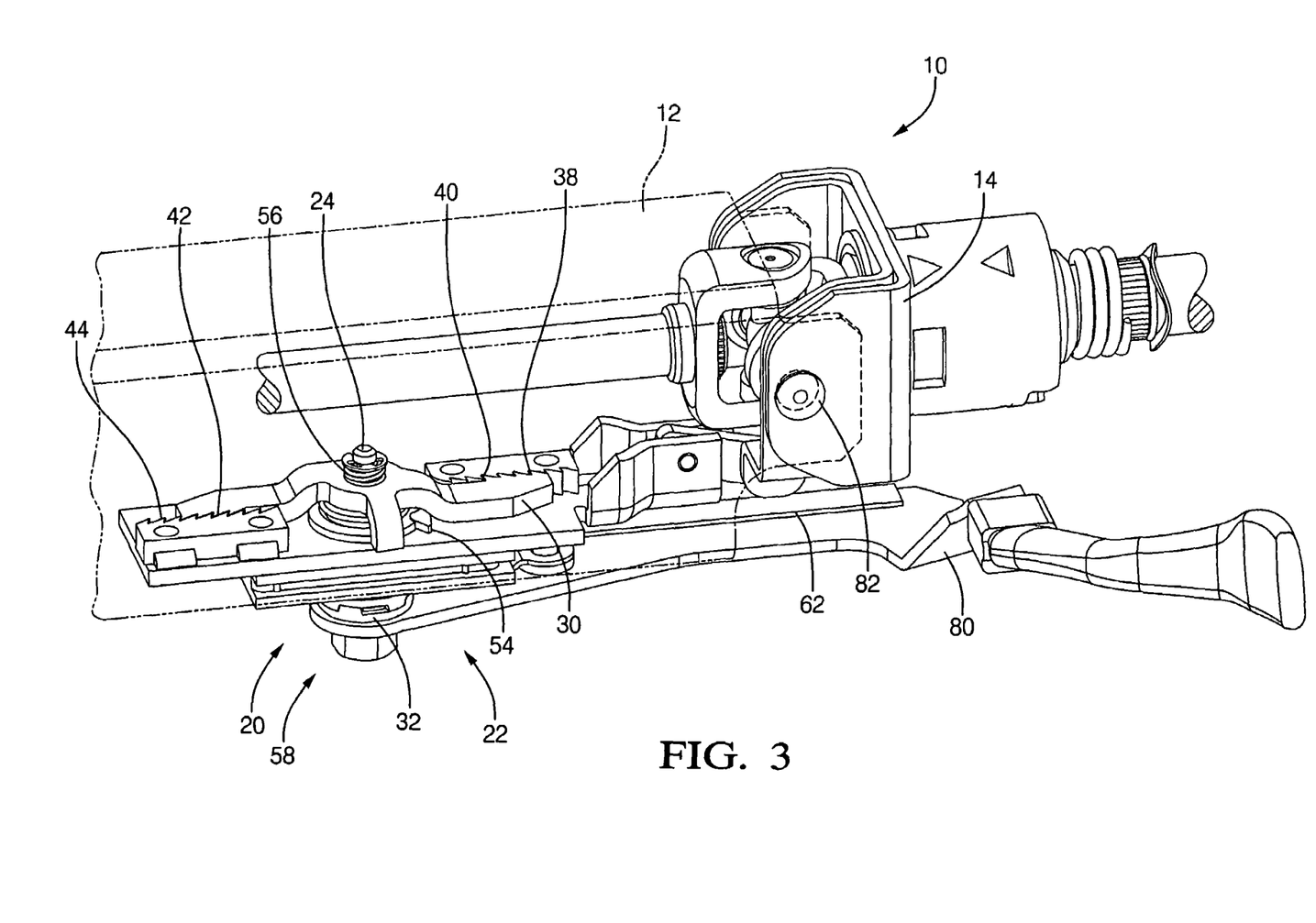
FIG. 3 is a perspective cut-away view of the exemplary embodiment of the invention.
Figures 4, 6:
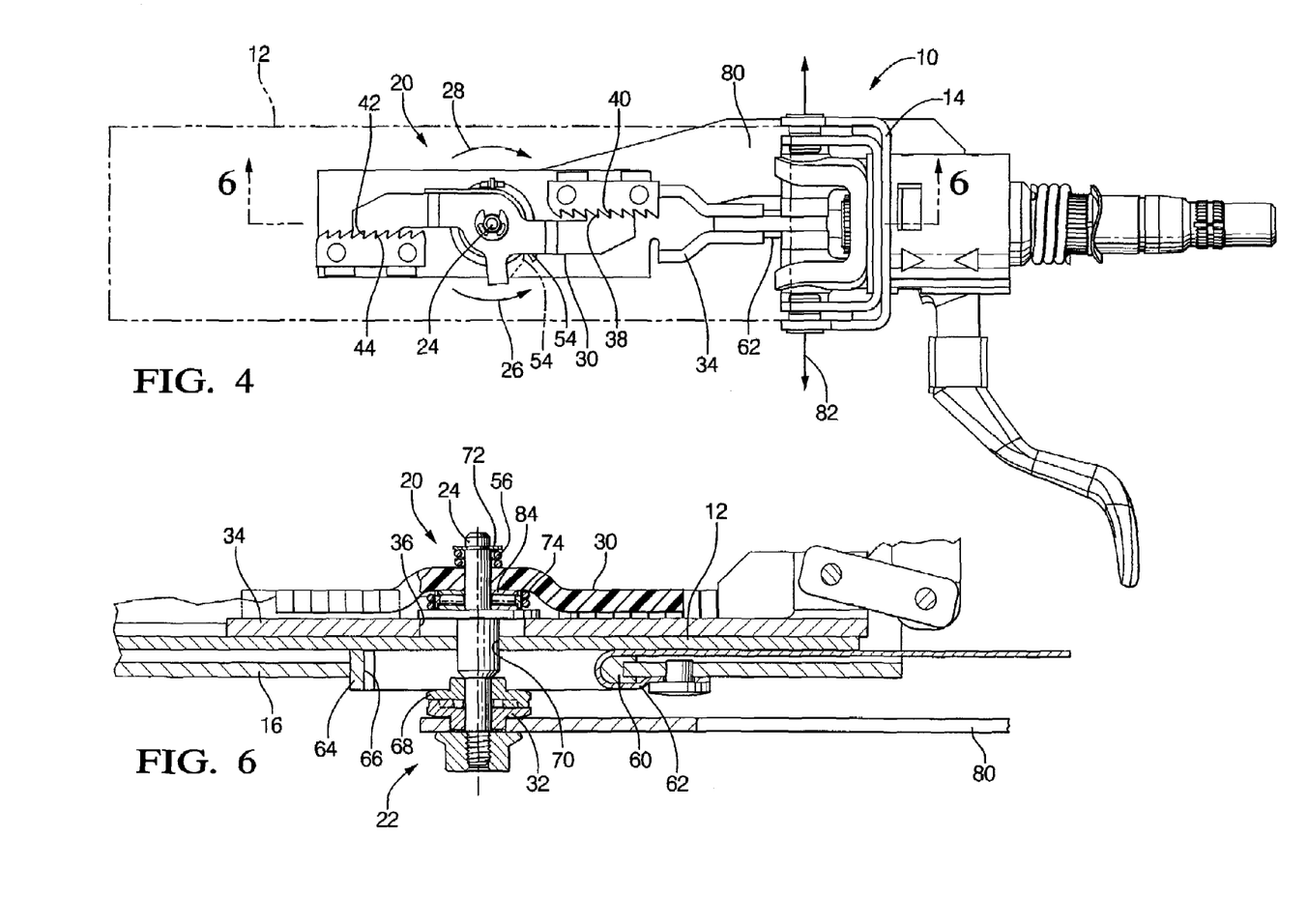
FIG. 4 is a first top-down cut-away view of the exemplary embodiment of the invention.
FIG. 6 is a cross-sectional view taken along section lines 6-6 in FIG. 1.
Figure 5:
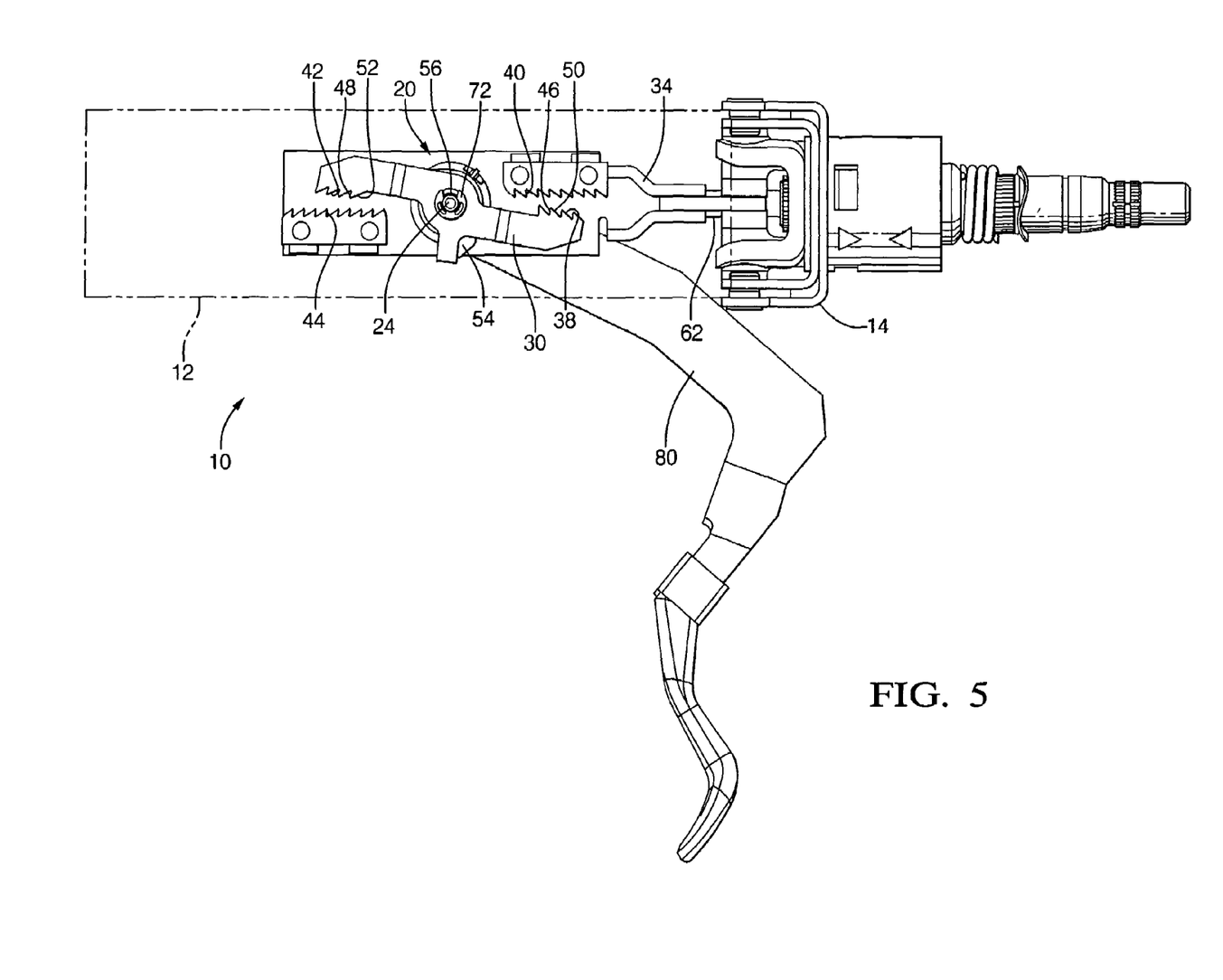
FIG. 5 is a second top-down cut-away view of the exemplary embodiment of the invention.

In the exemplary embodiment, the common member 24 is moveable between at least first, second and third positions. The first, second and third positions are best shown in FIGS. 4 and 5 with reference to a cam 54. The cam 54 is immovably associated with common member 24 and will be described in greater detail below.

FIG. 4 shows the cam 54 in solid line when said common member 24 is in the first position. When the common member 24 is in the first position, both the positive lock 20 and the friction lock 22 are in the respective locked configurations. In other words, pivotal and sliding movements are prevented when the common member 24 is in the first position.

FIG. 5 shows the cam 54 in solid line when said common member 24 is in the third position. When the common member 24 is in the third position, both the positive lock 20 and the friction lock 22 are in the respective unlocked configurations. In other words, pivotal and sliding movements can occur when the common member 24 is in the third position.

FIG. 4 shows the cam 54 in dashed line when said common member 24 is in the second position. When the common member 24 is in the second position, only the positive lock 20 is in the respective locked configuration. In the exemplary embodiment of the invention, the friction lock 22 is only partially locked when the common member 24 is in the second position. However, in alternative embodiments of the invention, the positive lock 20 and the friction lock 22 could be unlocked and locked currently in response to movement of the common member 24.

At least one benefit of the arrangement of the exemplary embodiment is that, in the event of a crash, slight movement of the common member 24 in the second direction 28 will not unlock the positive lock 20. For example, the common member 24 can be rotated by the driver with a lever 80. In a crash, the driver may move toward the steering wheel and could engage the lever 80 unintentionally, causing the common member 24 to move in the second direction 28. The common member 24 can be moved from the first position to the second position without disengaging the positive lock 20.

The positive lock 20 of the exemplary embodiment includes a locking arm 30 rotatibly associated with said common member 24. The cam 54 engages the locking arm 30 during movement of the common member 24 between the second and third positions. The cam 54 urges the locking arm 30 to move in the second direction 28 during movement from the second position to the third position. The positive lock 20 also includes a biasing member 74 urging said locking arm 30 to said locked position. The biasing member 74 is a torsional spring. The biasing member or torsion spring 74 encircles a thrust bearing 84 which encircles the common member 24.

The positive lock 20 of the exemplary embodiment also includes a tilt plate 34 pivotally engaged with said second steering column member 14. The tilt plate 34 and second steering column member 14 pivot, or tilt, with respect to one another about a pivot axis 82. The tilt plate 34 is slidably engaged with the first steering column member 12 along the axis 18. The axis 18 can be the longitudinal axis, or centerline, of the first steering column member 12. The tilt plate 34 defines a first slot 36 and the common member 24 extends through said first slot 36. The first slot 36 corresponds to the range of pivotal movement. For example, the longer the first slot 36 along the axis, the greater the range of pivotal movement of the second steering column member 14 relative to the first steering column member 12.

The positive lock 20 includes a first plurality of teeth 38 fixedly associated with the locking arm 30 and a second plurality of teeth 40 fixedly associated with said tilt plate 34. At least one of the first and second pluralities of teeth 38, 40 is moved relative to one other by the common member 24. In the exemplary embodiment of the invention, the first plurality of teeth 38 is moved into engagement with the second plurality of teeth 40 in response to movement of the common member 24 in the first direction 26 to the first position.

One of the first and second pluralities of teeth 38, 40 extend a greater length than the other of the first and second pluralities of teeth 38, 40. In the exemplary embodiment of the invention, the second plurality of teeth 40 extends a greater length than the first plurality of teeth 38. The difference in the lengths of the first and second pluralities of teeth 38, 40 corresponds to pivot movement of the first and second steering column members 12, 14 relative to one another. For example, the greater the range of pivotal movement of the second steering column member 14 relative to the first steering column member 12, the greater the difference in the lengths of the first and second pluralities of teeth 38, 40.

The positive lock 20 also includes a third plurality of teeth 42 fixedly associated with said locking arm 30 and a fourth plurality of teeth 44 fixedly associated with said tilt plate 34. At least one of the third and fourth pluralities of teeth 42, 44 are moved relative to the other of the third and fourth pluralities of teeth 42, 44 by the common member 24. In the exemplary embodiment of the invention, the third plurality of teeth 42 is moved into engagement with the fourth plurality of teeth 44 in response to movement of the common member 24 in the first direction 26, to the first position. The third and fourth pluralities of teeth 42, 44 are disposed on an opposite side of the common member 24 relative to the first and second pluralities of teeth 38, 40. One of the third and fourth pluralities of teeth 42, 44 extend a greater length than the other of the third and fourth pluralities of teeth 42, 44.

Each of the first and third pluralities of teeth 38, 42 includes a first surface 46, 48 substantially perpendicular to the locking arm 30 and a second surface 50, 52 extending acutely to the locking arm 30. The surfaces 46, 50 and 48, 52, respectively, intersect at a tip. The sets of teeth 38, 40 and 42, 44 can be inverted with respect to one another to reduce the likelihood that a collapsing force acting on the first and second steering column members 12, 14 will induce cam-cam follower action between the sets of teeth 38, 40 and 42, 44. For each tooth of the first plurality of teeth 38, the first surface 46 is disposed closer to said common member 24 than the second surface 50. The teeth 40 are configured in an opposite direction of the teeth 38 to promote meshing of the teeth 38, 40. For each tooth of the third plurality of teeth 42, the second surface 52 is disposed closer to the common member 24 than the first surface 48. In alternative embodiments of the invention, the first and third pluralities of teeth 38, 42 can be mirrored with respect to one another about the common member 24.

If the teeth 38, 40 and/or 42, 44 are engaged peak-to-peak with one another when a crash occurs, the torsion spring 74 has sufficient strength to urge the teeth 38,40 and 42, 44 into engagement with one another and prevent the teeth 38,40 and 42,44 from "skipping" relative to one another. In one embodiment of the invention, the width of each tooth is four millimeters and the height is two millimeters. If the speed of the collapsing steering column is fifteen miles per hour, the force of the torsion spring 74 should be approximately one hundred and sixty-seven Newtons, or thirty-eight pounds.

$$2\ mm=(\tfrac{1}{2})(Force/15\ grams)(5.96\times10^{-4})^2$$

The common member 24 of the exemplary embodiment extends through an aperture 70 defined by the first steering column member 12. As a result, the common member 24 is fixedly associated with said first steering column member 12 along the axis 18. The common member 24 is stretchable relative to the first steering column member 12 along its longitudinal axis, which extends transverse to the axis 18. Stretching of the common member 24 transverse to the axis 18 corresponds to the operation of the friction lock 22, which is described in greater detail below. The common member 24 includes a radial projection 72, such as a clip, and a compression spring 56 encircles the common member 24 between the radial projection 72 and the locking arm 30.

The compression spring 56 reduces the likelihood of rattling between the components of the positive lock 20 and the friction lock 22.

The friction lock 22 includes a cam follower 32 fixedly associated with the lever 80 and the common member 24. In other words, the cam follower 32 rotates in response to rotation of the common member in either the first or second directions 26, 28, 32. The locking arm 30 and the cam follower 32 are disposed at opposite ends of the common member 24. At least a portion of the first steering column member 12 is disposed between the locking arm 30 and the cam follower 32 along the longitudinal axis of the common member 24. At least a portion of the third steering column member 16 is disposed between the locking arm 30 and the cam follower 32 along the longitudinal axis of the common member 24.

The friction lock 22 also includes a cam 68 operable to cooperate with the cam follower 32 to stretch the common member 24 axially during rotation of said common member 24. For example, during movement of the common member 24 in the first direction 26 from the third position to the first position, the cam follower 32 and cam 68 cooperate to push each other apart and stretch the common member 24 axially, in a direction extending from the tilt plate 34 to the third steering column member 16. In response, a friction-generating force is produced urging the tilt plate 34 and the first steering column member 12 together. The cam 68 and cam follower 32 move closer relative to one another axially with respect to the common member 24 in response to movement of the common member 24 in the second direction 28.

The friction lock 22 also includes a capsule 64 releasibly associated with the third steering column member 16 in the exemplary embodiment of the invention. The capsule 64 is slidably disposed in a third slot 76 defined by the third steering column member 16. The capsule 64 is fixed with respect to the third steering column member 16 up to a predetermined amount of collapsing force acting against the steering column. The capsule 64 separates from the third steering column member 16 in response to a collapsing force acting against the steering column greater than the predetermined amount.

The capsule 64 defines a slot 66 and the common member 24 extends through the slot 66. The slot 66 corresponds to a range of the sliding movement. The sliding movement can be referred to as telescoping adjustment movement. The longer the slot 66, the greater the range of telescoping adjustment movement. In the exemplary embodiment of the invention, the length of the first slot 36 of the tilt plate 34 along the axis 18 is less than a length of the second slot 66 of the capsule 64.

The cam 68 is at least partially positioned in the slot 66. The friction-generating force, generated by the friction lock 22 and described in greater detail above, is produced in response to movement of the common member 24 in the first direction 26 from the third position to the first position. The friction-generating force urges the capsule 64 and the first steering column member 12 together. In the exemplary embodiment of the invention, the cam 68, capsule 64, first steering column member 12, and tilt plate 34 are urged together in response to movement of the common member 24 in the first direction 26 from the third position to the first position.

The capsule 64 supports at least one an energy dissipating device 58. The energy dissipating device 58 includes an anvil 60 and a strap 62. The strap 62 is fixedly associated with the third steering column member 16 and extends around the anvil 60 to a free end. The anvil is fixedly associated with capsule 64. In alternative embodiments of the invention, the anvil 60 can be fixedly associated with the third steering column member 16 and the strap can be fixedly associated with the capsule 64. The energy dissipating device 58 is operative to dissipate energy in response to the sliding movement when the friction lock 22 is engaged.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:

first and second steering column members engaged for pivotal movement relative to one another;

a third steering column member supporting said first steering column member for sliding movement along an axis;

a positive lock engaged with said first and second steering column members and operable in a locked configuration to prevent said pivotal movement and in an unlocked configuration to allow said pivotal movement, said positive lock having a locking arm defining a first plurality of teeth and a tilt plate defining a second plurality of teeth with said first and second pluralities of teeth being movable relative to one another to define said locked and unlocked configurations of said positive lock; and a friction lock engaged with said first and third steering column members and operable in a locked configuration to prevent said sliding movement and in an unlocked configuration to allow said sliding movement, said friction lock having a cam follower and a cam operable to cooperate with said cam follower to define said locked and unlocked configurations of said friction lock.

2. The apparatus of claim 1 wherein said positive lock and said friction lock share at least one common member.

3. The apparatus of claim 2 wherein said common member is moveable in first and second directions, wherein both of said positive lock and said friction lock change configuration to said respective locked configurations in response to movement of said common member in said first direction and change configuration to said respective unlocked configurations in response to movement of said common member in said second direction.

4. The apparatus of claim 3 wherein said common member is moveable between at least first, second and third positions, wherein both of said positive lock and said friction lock are in said respective locked configurations when said common member is in said first position and are in said respective unlocked configurations when said common member is in said third position, and wherein only said positive lock is in said respective locked configuration when said common member is in said second position.

5. The apparatus of claim 2 wherein:

said locking arm is rotatably associated with said common member; and said cam follower is fixedly associated with said common member.

6. The apparatus of claim 2 wherein said tilt plate is pivotally engaged with said second steering column member and slideably engaged with said first steering column member, wherein said common member is fixedly associated with said first steering column member along said axis.

7. The apparatus of claim 6 wherein said tilt plate defines a first slot and said common member extends through said first slot.

8. The apparatus of claim 6 wherein at least one of said first and second pluralities of teeth is moved relative to the other of said first and second pluralities of teeth by said common member.

9. The apparatus of claim 8 wherein one of said first and second pluralities of teeth extend a greater length than the other of said first and second pluralities of teeth.

10. The apparatus of claim 8 wherein said positive lock includes a third plurality of teeth fixedly associated with said locking arm and a fourth plurality of teeth fixedly associated with said tilt plate, wherein at least one of said third and fourth pluralities of teeth are moved relative to the other of said third and fourth pluralities of teeth by said common member, and wherein said third and fourth pluralities of teeth are disposed on an opposite side of said common member relative to said first and second pluralities of teeth.

11. The apparatus of claim 10 wherein one of said first and second pluralities of teeth extend a greater length than the other of said first and second pluralities of teeth and wherein one of said third and fourth pluralities of teeth extend a greater length than the other of said third and fourth pluralities of teeth.

12. The apparatus of claim 10 wherein each of said first and third pluralities of teeth includes a first surface substantially perpendicular to said locking arm and a second surface extending acutely to said locking arm, wherein said first surface of each of said first plurality of teeth is disposed closer to said common member than said second surface and wherein said second surface of each of said third plurality of teeth is disposed closer to said common member than said first surface.

13. The apparatus of claim 10 wherein said first and third pluralities of teeth are mirrored with respect to one another about the common member.

14. The apparatus of claim 6 wherein said common member is rotatable relative to said first steering column member.

15. The apparatus of claim 6 wherein said cam is fixedly associated with said common member, wherein said common member is moveable along a path of movement and said cam engages said locking arm during movement of said common member over less than all of said path.

16. The apparatus of claim 6 wherein said locking arm is moveable between locked and unlocked positions and said positive lock further comprises a biasing member urging said locking arm to said locked position.

17. The apparatus of claim 2 further comprising:
an energy dissipating device including an anvil and a strap and operative to dissipate energy in response to said sliding movement, wherein one of said anvil and said strap is fixedly associated with said friction lock and the other of said anvil and said strap is fixedly associated with said third steering column member.

18. The apparatus of claim 17 wherein said friction lock is releasbily associated with said third steering column member.

19. The apparatus of claim 2 wherein said cam follower is fixedly associated with said common member;
a capsule defining a slot, wherein said common member extends through said slot; and
said cam at least partially positioned in said slot and encircling said common member adjacent to said cam follower, wherein said common member is moveable in first and second directions and said cam and said cam follower move relative to one another in response to movement of said common member.

20. The apparatus of claim 19 wherein said cam and said cam follower move away from one another axially with respect to said common member in response to movement of said common member in said first direction.

21. The apparatus of claim 20 wherein said cam and said cam follower move closer relative to one another axially with respect to said common member in response to movement of said common member in said second direction.

22. An apparatus comprising:
first and second steering column members engaged for pivotal movement relative to one another;
a third steering column member supporting said first steering column member for sliding movement along an axis;
a positive lock engaged with said first and second steering column members and operable in a locked configuration to prevent said pivotal movement and in an unlocked configuration to allow said pivotal movement; and
a friction lock engaged with said first and third steering column members and operable in a locked configuration to prevent said sliding movement and in an unlocked configuration to allow said sliding movement, wherein said positive lock and said friction lock share at least one common member, wherein said common member is a shaft rotatable in first and second directions, and wherein said positive lock includes a locking arm encircling said shaft and said friction lock includes a cam follower fixedly associated with said shaft.

23. The apparatus of claim 22 wherein at least a portion of said first steering column member is disposed between said locking arm and said cam follower.

24. The apparatus of claim 23 wherein at least a portion of said third steering column member is disposed between said locking arm and said cam follower.

25. The apparatus of claim 22 wherein said shaft is rotatable between at least first, second and third positions, wherein said cam follower moves in response to rotation of said shaft between said first, second and third positions and said locking arm moves only in response to rotation of said shaft between said second and third positions.

26. The apparatus of claim 22 wherein said friction lock includes a cam operable to cooperate with said cam follower to stretch said shaft axially during rotation of said shaft.

27. The apparatus of claim 22 wherein said positive lock includes a tilt plate pivotally engaged with said second steering column member and slideably engaged with said first steering column member, wherein said tilt plate and said first steering column member are pressed together when said friction lock is disposed in said locked configuration.

28. The apparatus of claim 27 wherein said shaft extends through an aperture defined by said first steering column member and a first slot defined by said tilt plate.

29. The apparatus of claim 28 wherein said friction lock includes a capsule defining a second slot, wherein said shaft extends through said second slot of said capsule.

30. The apparatus of claim 29 further comprising:
an energy dissipating device including an anvil and a strap and operative to dissipate energy in response to said sliding movement, wherein one of said anvil and said strap is fixedly associated with said capsule and the other of said anvil and said strap is fixedly associated with said third steering column member.

31. The apparatus of claim 30 wherein said locking arm and said cam follower are disposed at opposite ends of said shaft.

32. The apparatus of claim 31 wherein said locking arm is moveable between a locked position and an unlocked position and said apparatus further comprises a torsion spring encircling said shaft and urging said locking arm to said locked position.

33. The apparatus of claim 32 wherein said shaft includes a radial projection disposed between said locking arm and said tilt plate and said apparatus further comprises a compression spring encircling said shaft and disposed between said radial projection and said tilt plate.

34. The apparatus of claim 33 wherein a length of said first slot of said tilt plate along said axis is less than a length of said second slot of said capsule.

35. The apparatus of claim 34 wherein said shaft extends transverse to said axis.

36. The apparatus of claim 35 wherein said third steering column member defines a third slot and said capsule is slideably disposed in said third slot of said third steering column member.

37. An apparatus comprising:
first and second steering column members engaged for pivotal movement relative to one another, said first steering column member defining an aperture;
a third steering column member supporting said first steering column member for sliding movement along an axis;
a positive lock engaged with said first and second steering column members and operable in a locked configuration to prevent said pivotal movement and in an unlocked configuration to allow said pivotal movement, said positive lock including a locking arm moveable between a locked position and an unlocked position and a torsion spring urging said locking arm to said locked position; and
a friction lock engaged with said first and third steering column members and operable in a locked configuration to prevent said sliding movement and in an unlocked configuration to allow said sliding movement, wherein said positive lock and said friction lock share at least one common member, wherein said common member is a shaft rotatable in first and second directions, and wherein said locking arm encircles said shaft and said friction lock includes a cam follower fixedly associated with said shaft, and wherein said friction lock also includes a capsule defining a second slot for receiving said shaft and a cam at least partially positioned in said second slot and encircling said shaft adjacent to said cam follower, and wherein said cam and said cam follower move relative to one another in response to rotation of said shaft.

38. The apparatus of claim 37 further comprising:
an energy dissipating device including an anvil and a strap and operative to dissipate energy in response to said sliding movement, wherein one of said anvil and said strap is fixedly associated with said capsule and the other of said anvil and said strap is fixedly associated with said third steering column member.

39. The apparatus of claim 38 wherein said capsule is releasibly associated with said third steering column member.

* * * * *